US010442033B2

(12) United States Patent
Oogushi et al.

(10) Patent No.: US 10,442,033 B2
(45) Date of Patent: Oct. 15, 2019

(54) CHAMFERING APPARATUS AND CHAMFERING METHOD

(71) Applicant: KAWASAKI JUKOGYO KABUSHIKI KAISHA, Kobe-shi, Hyogo (JP)

(72) Inventors: Osami Oogushi, Kobe (JP); Hideyuki Tanaka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 121 days.

(21) Appl. No.: 15/579,440

(22) PCT Filed: Jun. 2, 2016

(86) PCT No.: PCT/JP2016/002687
§ 371 (c)(1),
(2) Date: Dec. 4, 2017

(87) PCT Pub. No.: WO2016/194384
PCT Pub. Date: Dec. 8, 2016

(65) Prior Publication Data
US 2018/0141154 A1    May 24, 2018

(30) Foreign Application Priority Data

Jun. 2, 2015   (JP) ................................ 2015-112134

(51) Int. Cl.
*B23K 26/064*    (2014.01)
*B23K 26/38*    (2014.01)
(Continued)

(52) U.S. Cl.
CPC ............ *B23K 26/064* (2015.10); *B23K 26/38* (2013.01); *B23K 26/53* (2015.10); *B23K 26/55* (2015.10);
(Continued)

(58) Field of Classification Search
CPC ...... B23K 26/064; B23K 26/53; B23K 26/38; B23K 26/55; B23K 2103/54; C03B 33/0222; C03B 33/091
See application file for complete search history.

(56) References Cited

U.S. PATENT DOCUMENTS

2013/0126573 A1*  5/2013  Hosseini ............ B23K 26/0604
                                                    225/2
2014/0340730 A1* 11/2014  Bergh .................... B23K 26/38
                                                    359/275
(Continued)

FOREIGN PATENT DOCUMENTS

JP        2013-536081 A     9/2013
KR   10-2015-0016177 A     2/2015
(Continued)

*Primary Examiner* — Nahida Sultana
(74) *Attorney, Agent, or Firm* — Oliff PLC

(57) ABSTRACT

A chamfering apparatus includes: a laser beam transmissive member allowing a laser beam to be transmitted therethrough and contacting one surface of a workpiece, the laser beam transmissive member including an inclined surface that is inclined in an opposite direction to a chamfering direction relative to the one surface in a state where the laser beam transmissive member is in contact with the one surface; and a laser machining head configured to emit an ultrashort pulse laser beam for forming a laser filament inside an edge portion to the inclined surface of the laser beam transmissive member. The ultrashort pulse laser beam is transmitted through the laser beam transmissive member, incident on the one surface of the workpiece from the laser beam transmissive member, transmitted through the edge portion in the chamfering direction, and forms a laser filament inside the edge portion, the laser filament extending in the chamfering direction.

13 Claims, 10 Drawing Sheets

(51) Int. Cl.
  *B23K 26/55* (2014.01)
  *C03B 33/09* (2006.01)
  *C03B 33/02* (2006.01)
  *B23K 26/53* (2014.01)
  *B23K 103/00* (2006.01)

(52) U.S. Cl.
  CPC ........ *C03B 33/0222* (2013.01); *C03B 33/091* (2013.01); *B23K 2103/54* (2018.08)

(56) References Cited

U.S. PATENT DOCUMENTS

| | | |
|---|---|---|
| 2015/0034612 A1* | 2/2015 | Hosseini ............ B23K 26/0648 |
| | | 219/121.61 |
| 2015/0034613 A1 | 2/2015 | Hosseini |
| 2015/0075222 A1 | 3/2015 | Mader |
| 2016/0016257 A1* | 1/2016 | Hosseini ............ B23K 26/0648 |
| | | 65/112 |
| 2017/0250113 A1* | 8/2017 | Vanagas ............. B23K 26/0006 |
| 2018/0133837 A1* | 5/2018 | Greenberg ......... B23K 26/0624 |

FOREIGN PATENT DOCUMENTS

| | | |
|---|---|---|
| KR | 10-2015-0032864 A | 3/2015 |
| WO | 2012/006736 A2 | 1/2012 |
| WO | 2016/010991 A1 | 1/2016 |

\* cited by examiner

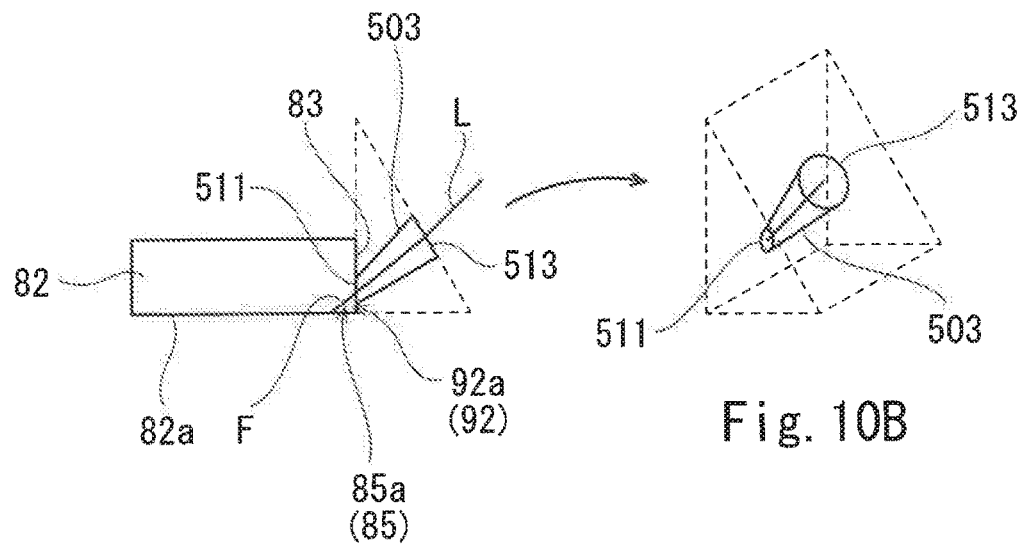
Fig. 10A
Fig. 10B
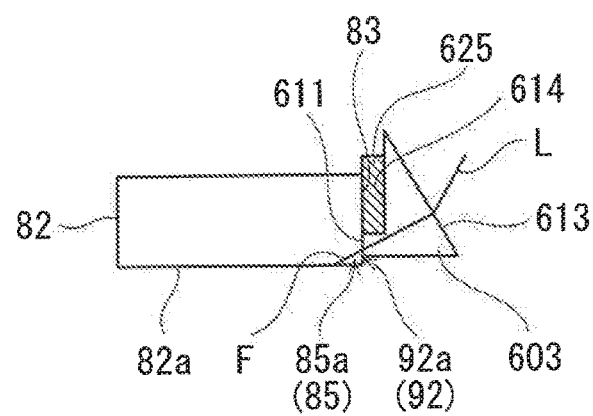
Fig. 11

CHAMFERING APPARATUS AND CHAMFERING METHOD

TECHNICAL FIELD

The present invention relates to an apparatus for and a method of chamfering an edge portion of a workpiece.

BACKGROUND ART

In the manufacturing of a glass plate product, a workpiece is obtained by cutting it out of a raw material, such that the workpiece is in a size that matches the size of the product, and then chamfering is performed on edge portions of the workpiece. Generally speaking, it is desirable that the chamfering angle be about 45°.

Conventionally, chamfering has been performed mainly by a mechanical method using grinding stone. However, in such a mechanical method, cullet is generated and adheres to the workpiece during the chamfering. Therefore, it is necessary to clean the workpiece after the chamfering.

Patent Literature 1 proposes chamfering edge portions by forming laser filaments inside glass (see, in particular, FIGS. 4 and 5). This chamfering technique indicates a possibility of overcoming the drawbacks in conventional chamfering methods.

CITATION LIST

Patent Literature

PTL 1: Japanese National Phase PCT Laid-Open Application Publication No. 2013-536081

SUMMARY OF INVENTION

Technical Problem

However, it is considered that in order to obtain a desirable chamfering angle through actual application of this chamfering technique, it is necessary to diagonally emit a pulse laser beam onto the surface of the workpiece. In such a case, the incidence angle at the surface of the workpiece may become excessive great, and accordingly, there is a risk of great reflection loss at the surface of the workpiece. Thus, in this case, it is considered that forming laser filaments inside the workpiece is difficult, and for this reason chamfering cannot be realized.

An object of the present invention is to provide an apparatus for and a method of chamfering an edge portion of a workpiece at a desirable chamfering angle by forming laser filaments inside the workpiece.

Solution to Problem

A chamfering apparatus according to one aspect of the present invention is a chamfering apparatus for forming a tapered surface on an edge portion formed by two surfaces of a workpiece, the workpiece allowing a laser beam to be transmitted therethrough, the tapered surface extending in a chamfering direction that is inclined relative to one of the two surfaces. The chamfering apparatus includes: a laser beam transmissive member that allows a laser beam to be transmitted therethrough and that contacts the one surface of the workpiece, the laser beam transmissive member including an inclined surface that is inclined in an opposite direction to the chamfering direction relative to the one surface in a state where the laser beam transmissive member is in contact with the one surface; and a laser machining head configured to emit an ultrashort pulse laser beam for forming a laser filament inside the edge portion to the inclined surface of the laser beam transmissive member, such that the ultrashort pulse laser beam is transmitted through the laser beam transmissive member, incident on the one surface of the workpiece from the laser beam transmissive member, transmitted through the edge portion in the chamfering direction, and forms a laser filament inside the edge portion, the laser filament extending in the chamfering direction.

According to the above configuration, the inclined surface of the laser beam transmissive member is positioned on the optical path of the ultrashort pulse laser beam, and forms an interface between a medium through which the ultrashort pulse laser beam emitted from the laser machining head propagates (i.e., incidence side) and the laser beam transmissive member (i.e., transmission side). The one surface of the workpiece is positioned on the optical path of the ultrashort pulse laser beam, and forms an interface between the laser beam transmissive member (i.e., incidence side) and the workpiece (i.e., transmission side). Assume that the incidence angle at the one surface is $i_2$, and the inclination angle of the inclined surface relative to the one surface is $\varphi$. In this case, the refraction angle $r_1$ at the inclined surface satisfies the following equation: $r_1 = i_2 - \varphi$. In order to increase the incidence angle $i_2$ at the one surface for the purpose of adjusting the chamfering direction to a direction corresponding to a desirable chamfering angle, the inclination angle $\varphi$ may be set to a value close to the incidence angle $i_2$ based on the following equation: $r_1 = i_2 - \varphi$. In this manner, the refraction angle $r_1$ at the inclined surface can be reduced. As a result, the incidence angle $i_1$ at the inclined surface can also be reduced. This makes it possible to suppress the reflection loss of the ultrashort pulse laser beam at the inclined surface.

As described above, the ultrashort pulse laser beam is incident on the surface of the workpiece through the laser beam transmissive member including the inclined surface, which is inclined in the opposite direction to the chamfering direction. This makes it possible to make the incidence angle $i_2$ at the surface of the workpiece great and allow the ultrashort pulse laser beam to be transmitted through the workpiece while making the incidence angle $i_1$ at the inclined surface small to suppress the reflection loss at the inclined surface. As a result, necessary beam intensity for forming the laser filament inside the edge portion can be obtained, and the chamfering of the edge portion of the workpiece can be performed at a desirable chamfering angle.

The chamfering apparatus may include a machining head scanning device configured to move the laser machining head in an extending direction of the edge portion. The laser beam transmissive member may extend in the extending direction in a state where the laser beam transmissive member is in contact with the one surface. The laser machining head may emit the ultrashort pulse laser beam to the inclined surface of the laser beam transmissive member while being moved by the machining head scanning device in the extending direction relative to the laser beam transmissive member and the workpiece.

This configuration makes it possible to readily keep the state where the laser beam transmissive member is in contact with the surface of the workpiece. As a result, the reflection loss at the surface is suppressed.

The chamfering apparatus may include a machining head scanning device including: a machining head holder configured to hold the laser machining head; and a transmissive member holder configured to hold the laser beam transmissive member, the machining head scanning device moving the laser machining head and the laser beam transmissive member in an extending direction of the edge portion relative to the workpiece in a state where the laser beam transmissive member held by the transmissive member holder is in contact with the one surface. The laser machining head may emit the ultrashort pulse laser beam to the inclined surface of the laser beam transmissive member while being moved by the machining head scanning device together with the laser beam transmissive member in the extending direction relative to the workpiece.

The chamfering apparatus may include a workpiece conveying device configured to move the workpiece parallel to an extending direction of the edge portion. The laser machining head and the laser beam transmissive member may be not conveyed by the workpiece conveying device. The laser beam transmissive member may contact the one surface of the workpiece while the workpiece is being moved by the workpiece conveying device in the extending direction. The laser machining head may emit the ultrashort pulse laser beam to the inclined surface of the laser beam transmissive member.

The chamfering apparatus may include a workpiece conveying device configured to move the workpiece parallel to an extending direction of the edge portion. The laser machining head may be not conveyed by the workpiece conveying device. The laser beam transmissive member may be moved by the workpiece conveying device together with the workpiece in a state where the laser beam transmissive Member is in contact with the one surface. The laser machining head may emit the ultrashort pulse laser beam to the inclined surface of the laser beam transmissive member while the laser beam transmissive member is being moved by the workpiece conveying device.

The laser beam transmissive member may include: a contacted surface that makes surface contact with the one surface; and a prism including the inclined surface.

The laser beam transmissive member may be a liquid member. The chamfering apparatus may include: a transmissive member reservoir configured to store the laser beam transmissive member; and a workpiece holder configured to hold the workpiece in a state where the edge portion is immersed in the laser beam transmissive member stored in the transmissive member reservoir. A liquid surface of the laser beam transmissive member in the transmissive member reservoir may form the inclined surface. The workpiece holder may hold the workpiece in a state where the one surface of the workpiece is inclined relative to the liquid surface.

A chamfering method according to another aspect of the present invention is a chamfering method of forming a tapered surface on an edge portion formed by two surfaces of a workpiece, the workpiece allowing a laser beam to be transmitted therethrough, the tapered surface extending in a chamfering direction that is inclined relative to one of the two surfaces. The method includes: bringing a laser beam transmissive member that allows a laser beam to be transmitted therethrough into contact with the one surface, such that an inclined surface of the laser beam transmissive member is inclined in an opposite direction to the chamfering direction relative to the one surface; emitting an ultrashort pulse laser beam for forming a laser filament inside the edge portion to the inclined surface of the laser beam transmissive member, such that the ultrashort pulse laser beam is transmitted through the laser beam transmissive member, incident on the one surface of the workpiece from the laser beam transmissive member, and transmitted through the edge portion in the chamfering direction; and forming a laser filament inside the edge portion by the ultrashort pulse laser beam, the laser filament extending in the chamfering direction.

Advantageous Effects of Invention

The present invention makes it possible to chamfer an edge portion of a workpiece at a desirable chamfering angle by forming laser filaments inside the workpiece.

BRIEF DESCRIPTION OF DRAWINGS

FIG. 10A is a sectional view of a laser beam transmissive member according to Embodiment 5, and FIG. 10B is a perspective view of the laser beam transmissive member.

FIG. 11 is a sectional view of a laser beam transmissive member according to Embodiment 6.

DESCRIPTION OF EMBODIMENTS

Figure 1:
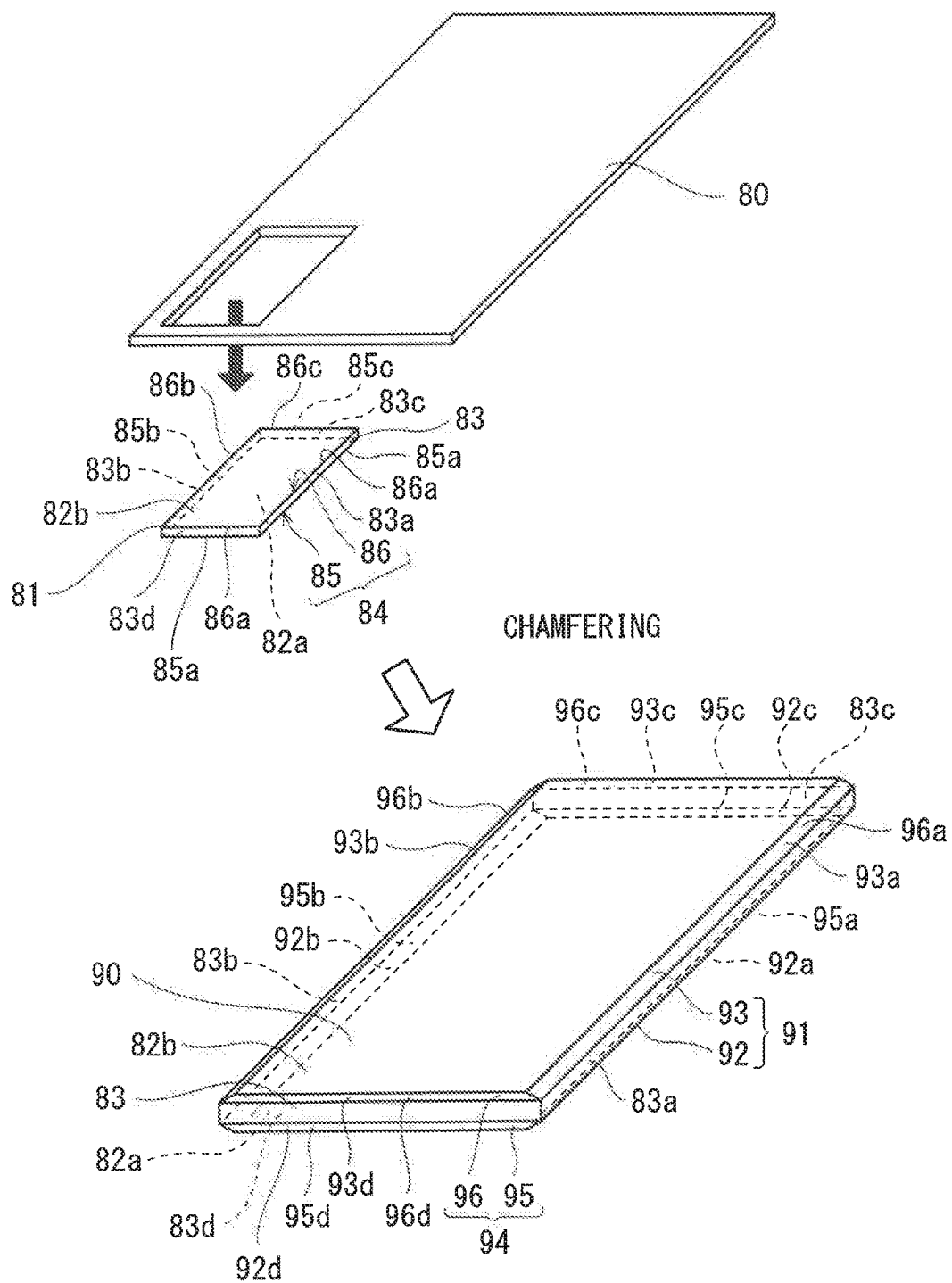
FIG. 1 shows one example of a workpiece on which chamfering is performed by a chamfering method and a chamfering apparatus according to Embodiment 1.

Hereinafter, embodiments of the present invention are described with reference to the drawings. In the drawings, the same or corresponding elements are denoted by the same reference signs, and repeating the same detailed descriptions is avoided below.

(Embodiment 1)

[Application Example, Workpiece]

As shown in FIG. 1, a chamfering method of the present embodiment is suitably performable in the manufacturing process of a plate-shaped product 90, such as a glass substrate for liquid crystal, a cover glass for a liquid crystal display or organic light-emitting diode display, or an architectural plate glass. In the manufacturing of the product 90, first, a plate-shaped workpiece 81 is obtained by cutting it out of a plate-shaped raw material 80, such that the workpiece 81 is in a size that matches the size of the product 90. It should be noted that the method of cutting the workpiece 81 out of the raw material 80 is not particularly limited. For example, mechanical cutting or laser cutting is used.

The workpiece 81 includes, as its surfaces, a pair of flat surfaces 82a and 82b spaced apart from each other in the thickness direction of the workpiece 81 and side surfaces 83 connecting between the flat surfaces 82a and 82b. The workpiece 81 includes, as its edge portions 84, first edge portions 85 and second edge portions 86. The first edge portions 85 are formed by the first flat surface 82a and the side surfaces 83. The second edge portions 86 are formed by the second flat surface 82b and the side surfaces 83. When seen in a plan view, the first edge portions 85 form a closed loop along the sides of the first flat surface 82a. The same is true of the second edge portions 86. The flat surfaces 82a and 82b are substantially congruent with each other. The side surfaces 83 are substantially perpendicular to the flat surfaces 82a and 82b. Each edge portion 84 forms a substantially 90° sharp edge.

Next, chamfering is performed on these edge portions 84. As a result of the chamfering, chamfered portions 91 are formed on the respective edge portions 84. The chamfered portions 91 include first chamfered portions 92 and second chamfered portions 93. The first chamfered portions 92 are formed on the respective first edge portions 85, and the second chamfered portions 93 are formed on the respective second edge portions 86. The chamfered portions 91 include respective tapered surfaces 94. Each of the tapered surfaces 94 connects between two surfaces that form a corresponding one of the edge portions 84. Each tapered surface 94 is inclined relative to the two surfaces, and extends in the extending direction of the corresponding edge portion 84. The tapered surfaces 94 include first tapered surfaces 95 of the respective first chamfered portions 92 and second tapered surfaces 96 of the respective second chamfered portions 93.

One of the purposes of the chamfering is to reduce external impact shock (i.e., to prevent damage to the product 90 when an external object hits the product 90, and prevent damage to the external object at the time). In the chamfering method of the present embodiment, each chamfered portion 91 is formed such that the angle formed between the tapered surface 94 and one of the two surfaces forming the edge portion 84, i.e., the chamfering angle, is about 45°.

As one example, the workpiece 81 is rectangular When seen in its thickness direction (i.e., when seen in a plan view). The side surfaces 83 include: a first long side surface 83a connecting between first long sides of the respective two flat surfaces 82a and 82b; a second long side surface 83b connecting between second long sides of the respective two flat surfaces 82a and 82b; a first short side surface 83c connecting between first short sides of the respective two flat surfaces 82a and 82b; and a second short side surface 83d connecting between second short sides of the respective two flat surfaces 82a and 82b.

In this case, the first edge portions 85 include: a first long edge portion 85a, which is formed by the first flat surface 82a and the first long side surface 83a and which extends in the extending direction of the first long side (perpendicularly to the thickness direction); a second long edge portion 85b, which is formed by the first flat surface 82a and the second long side surface 83b and which extends in the extending direction of the second long side (in parallel to the extending direction of the first long side); a first short edge portion 85c, which is formed by the first flat surface 82a and the first short side surface 83c and which extends in the extending direction of the first short side (perpendicularly to the extending direction of the first long side and perpendicularly to the thickness direction); and a second short edge portion 85d, which is formed by the first flat surface 82a and the second short side surface 83d and which extends in the extending direction of the second short side (in parallel to the extending direction of the first short side). Reference signs 92a to 92d in FIG. 1 denote a first long chamfered portion, a second long chamfered portion, a first short chamfered portion, and a second short chamfered portion corresponding to the edge portions 85a to 85d, respectively, and these chamfered portions are first chamfered portions 92. Reference signs 95a to 95d denote a first long tapered surface, a second long tapered surface, a first short tapered surface, and a second short tapered surface corresponding to the chamfered portions 92a to 92d, respectively, and these tapered surfaces are the first tapered surfaces 95.

The same applies to the second edge portions 86, the second chamfered portions 93, and the second tapered surfaces 96. Similar to the edge portions 85a to 85d, reference signs 86a to 86d in FIG. 1 denote a third long edge portion, a fourth long edge portion, a third short edge portion, and a fourth short edge portion, which are the second edge portions 86. Reference signs 93a to 93d denote a third long chamfered portion, a fourth long chamfered portion, a third short chamfered portion, and a fourth short chamfered portion corresponding to the edge portions 86a to 86d, respectively, and these chamfered portions are the second chamfered portions 93. Reference signs 96a to 96d denote a first long tapered surface, a second long tapered surface, a first short tapered surface, and a second short tapered surface corresponding to the chamfered portions 93a to 93d, respectively, and these tapered surfaces are the second tapered surfaces 96.

In the chamfering method of the present embodiment, laser filaments F (see FIGS. 2B and 3A) are formed inside the edge portions 84 of the workpiece 81. Each laser filament F is a hollow portion formed inside the workpiece 81 when an ultrashort pulse laser beam L (see FIGS. 2A, 2B, and 3A) is transmitted through the inside of the workpiece 81. The laser filament F extends linearly along the optical path of the ultrashort pulse laser beam L. In the present specification, the description of the details of the formation principle of the laser filament F is omitted.

The ultrashort pulse laser beam L is a pulse laser beam whose pulse duration is set to a short time of, for example, several femtoseconds to several hundred picoseconds. Other various parameters of the ultrashort pulse laser beam L (e.g., energy, beam intensity, wavelength, and focal length) are set such that the laser filaments F are formed inside the edge portions 84. The wavelength is, for example, set to be within the range from the green light region to the near-infrared region. Alternatively, the wavelength may be set outside the range. The focal length is set such that the focal point is positioned inside each edge portion 84.

The workpiece 81 is made of a material that allows the ultrashort pulse laser beam L to be transmitted therethrough and that has such brittleness that laser machining is performable thereon. Suitable examples of the material of the workpiece 81 include glass (e.g., soda glass, quartz glass, LCD glass, hybrid glass, tempered glass, etc.), single crystal corundum (e.g., sapphire glass), and ceramic.

[Chamfering Apparatus]

Figure 2A:
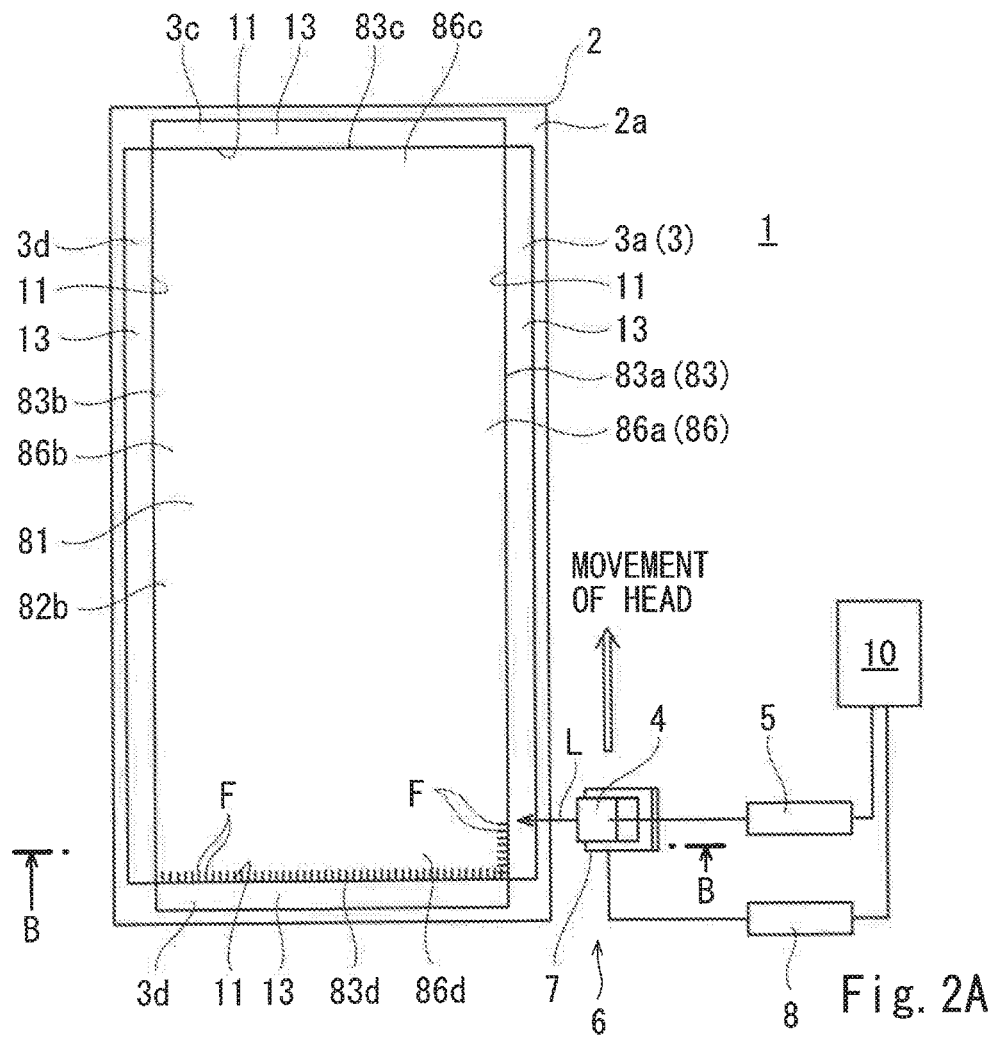
FIG. 2A is a plan view of the chamfering apparatus according to Embodiment 1.
Figure 2B:
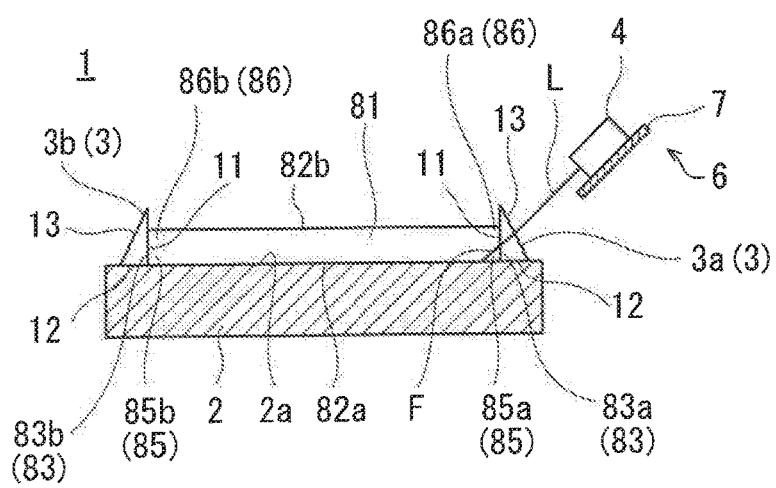
FIG. 2B is a view seen in the direction of arrows B-B of FIG. 2A.

FIGS. 2A and 2B show a chamfering apparatus 1 of Embodiment 1. The chamfering apparatus 1 includes: a holding stand 2; a laser beam transmissive member 3; a laser machining head 4; a laser oscillator 5; and a machining head scanning device 6. The machining head seaming device 6 includes: a machining head holder 7 configured to hold the laser machining head 4; and a movement actuator 8 configured to move the machining head holder 7. Operations of the laser oscillator 5 and the movement actuator 8 are controlled by a controller 10.

The holding stand 2 holds the workpiece 81. The holding stand 2 includes a horizontal top surface 2a, in which a large number of vent holes (not shown) are formed. The holding stand 2 may be of a suction type or a floating type. The holding stand 2 may suck air through the vent holes to suck the workpiece 81 onto the top surface 2a, or may blow air out of the vent holes to make the workpiece 81 float slightly above the top surface 2a. In either case, the holding stand 2 holds the workpiece 81 in such an orientation that the first flat surface 82a or the second flat surface 82b extends horizontally directly on or slightly above the top surface 2a.

The laser beam transmissive member 3 allows the ultrashort pulse laser beam L to be transmitted therethrough. The laser beam transmissive member 3 contacts one of the two surfaces forming each edge portion 84. The laser beam transmissive member 3 includes inclined surfaces 13, each of which is inclined relative to the one surface when the laser beam transmissive member 3 is in contact with the one surface.

FIGS. 2A and 2B show a state where chamfering is being performed on the first edge portions 85 (including the first long edge portion 85a, the second long edge portion 85b, the first short edge portion 85c, and the second short edge portion 85d). Of the two surfaces forming each first edge portion 85 (i.e., the first flat surface 82a and the side surface 83), the first flat surface 82a faces the top surface 2a of the holding stand 2. The laser beam transmissive member 3 is made of an optical glass prism, and includes contacted surfaces 11, each of which makes surface contact with the side surface 83, which is one of the two surfaces forming the first edge portion 85.

As shown in FIG. 2A, when seen in a plan view, the top surface 2a of the holding stand 2 is larger than the workpiece 81, and the edge lines of the workpiece 81 are positioned inward of the edge lines of the top surface 2a. As shown in FIG. 2B, the laser beam transmissive member 3 includes a supported surface 12, which is supported on the top surface 2a outside the edge lines of the workpiece 81. The laser beam transmissive member 3 is held by the holding stand 2 in a state where the contacted surfaces 11 are in contact with respective surfaces (the side surfaces 83) of the workpiece 81. The side surfaces 83 stand upright perpendicularly to the first flat surface 82a. The laser beam transmissive member 3 has a right-triangle cross section. Each contacted surface 11 forms a right angle with the supported surface 12, and each inclined surface 13 forms the hypotenuse of the right triangle. The contacted surfaces 11 contact the respective side surfaces 83 in a state where the contacted surfaces 11 stand upright perpendicularly to the supported surface 12 and the top surface 2a supporting the supported surface 12. The inclined surfaces 13 are inclined such that the closer the inclined surfaces 13 are to the top surface 2a, the more distant the inclined surfaces 13 are from the contacted surfaces 11 and the surfaces being in contact therewith (i.e., the side surfaces 83).

As shown in FIG. 2A, the laser beam transmissive member 3 extends in the extending directions of the edge portions 84 when the laser beam transmissive member 3 is in contact with the surfaces of the workpiece 81. Specifically, the laser beam transmissive member 3 includes: a first long transmissive member 3a, which extends in the extending direction of the first long edge portion 85a (i.e., the extending direction of the first long side) and which is in surface contact with the entire first long side surface 83a in the extending direction; a second long transmissive member 3b, which extends in the extending direction of the second long edge portion 85b (i.e., the extending direction of the first long side) and which is in surface contact with the entire second long side surface 83b in the extending direction; a first short transmissive member 3c, which extends in the extending direction of the first short edge portion 85c (i.e., the extending direction of the first short side) and which is in surface contact with the entire first short side surface 83c in the extending direction; and a second short transmissive member 3d, which extends in the extending direction of the second short edge portion 85d (i.e., the extending direction of the second short side) and which is in surface contact with the entire second short side surface 83d in the extending direction. These four transmissive members 3a to 3d may be formed as separate members. Alternatively, the four transmissive members 3a to 3d may be partly or entirely integrated together. As one example, the first long transmissive member 3a and the first short transmissive member 3c may form a transmissive member that is L-shaped when seen in a plan view, and also, the second long transmissive member 3b and the second short transmissive member 3d may form a transmissive member that is L-shaped when seen in a plan view. As another example, the four transmissive members 3a to 3d may form a transmissive member that is in the shape of a rectangular window frame when seen in a plan view.

The laser machining head 4 emits the ultrashort pulse laser beam L, which is intended for forming laser filaments F inside the edge portions 84, to each inclined surface 13 of the laser beam transmissive member 3 while being moved by the machining head scanning device 6 in the extending direction of the corresponding edge portion 84 relative to the holding stand 2, the laser beam transmissive member 3, and the workpiece 81. The laser oscillator 5 oscillates the ultrashort pulse laser beam L. The laser machining head 4 may include an objective lens (not shown) for adjusting the focal length, such that the ultrashort pulse laser beam L focuses inside the edge portion 84. The laser machining head 4 may be provided with a fine adjustment mechanism configured to cause the laser machining head 4 to make micromovements, such that the laser light is precisely emitted to machining positions based on glass end surface information that is obtained through measurement by a glass end surface measuring device. In this case, the operation of the fine adjustment mechanism may be controlled by the controller 10.

The laser machining head 4 moves along the extending direction of each of the first edge portions 85, which form a closed loop when seen in a plan view. While the laser machining head 4 is moving from one end to the other end of the first long edge portion 85a in the extending direction of the first long edge portion 85a (i.e., the extending direction of the first long side), a large number of laser filaments F are formed inside the first long edge portion 85a, such that the laser filaments F are arranged in the extending direction of the first long edge portion 85a. A large number of laser filaments F are also formed inside each of the other edge portions 85b to 85d of the first edge portions 85 in the same manner. The machining head scanning device 6 may be configured in any form. For example, the machining head holder 7 may be realized by a linear motion mechanism that is programmed to move along predetermined moving paths, and the movement actuator 8 may be an electric motor that drives the linear motion mechanism.

Figure 3A:
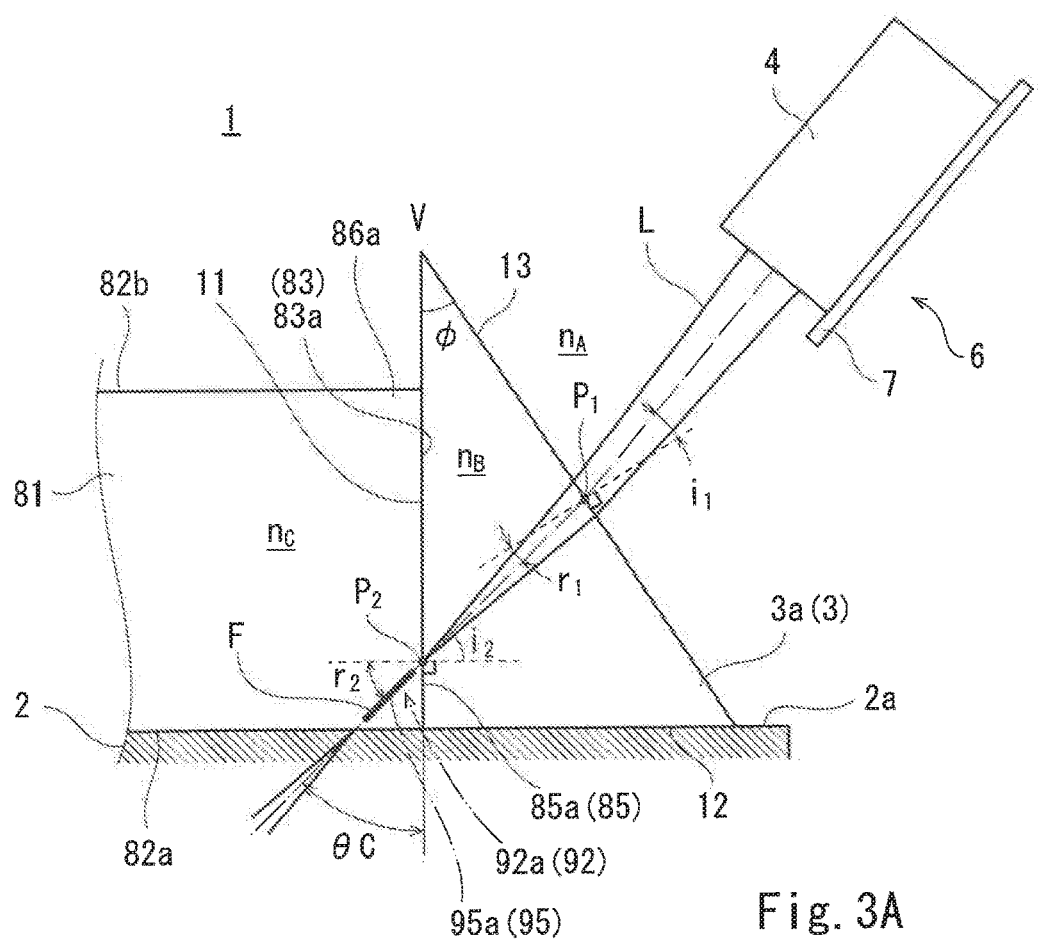
FIG. 3A is an enlarged view of FIG. 2B.
Figure 3B:
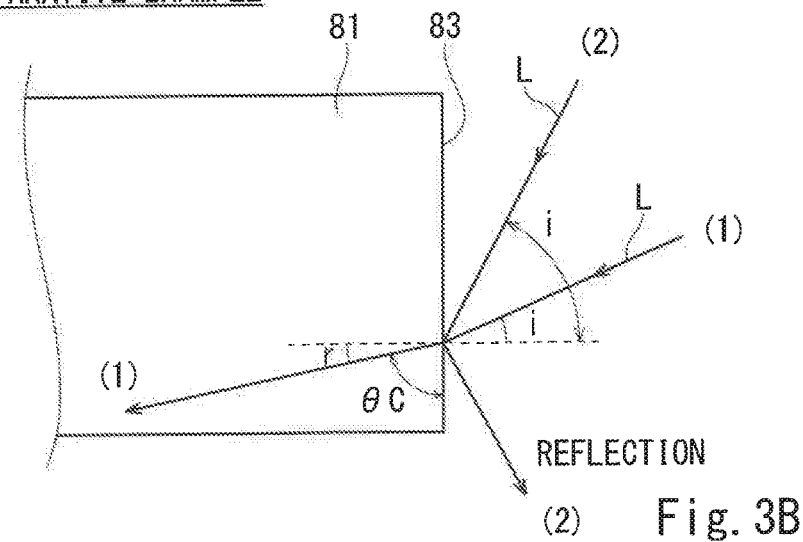
FIG. 3B shows a comparative example.

FIG. 3A is an enlarged view of FIG. 2B, and FIG. 3B shows a comparative example. The laser beam transmissive member 3 is absent in the comparative example. In such a case, the ultrashort pulse laser beam L needs to be directly incident on the side surface 83 of the workpiece 81 after propagating through air. The incidence angle i at the side surface 83 is the arc sine of a value that is obtained by multiplying the relative refractive index n of the workpiece 81 relative to the air by the sine of the refraction angle r (i=arcsin (nsinr)). The refraction angle r at the side surface 83 is the complementary angle of the chamfering angle $\theta_C$ (r=90−$\theta_C$).

As one non-limiting example, assume that the relative refractive index n of the workpiece 81 relative to the air is 1.45. In this case, if the refraction angle r is 43.6°, then the incidence angle i is 90° (sin90°≈1.45sin43.6°). In the first place, reflection of the ultrashort pulse laser beam L on the side surface 83 becomes obvious around when the incidence angle i exceeds 18°. If the incidence angle i is set to 17.5° as indicated by a light beam (1) in order to allow the ultrashort pulse laser beam L to be sufficiently transmitted through the workpiece 81, then the refraction angle r is 12.0° (r=arcsin (sin17.5°/1.45)). In this case, the chamfering angle $\theta_C$ is 78.0°, which is far from a desirable value (e.g., 45°). Even if the incidence angle i is increased as indicated by a light beam (2) in order to bring the chamfering angle $\theta_C$ closer to 45°, most of the ultrashort pulse laser beam L reflects on the side surface 83, and thus the ultrashort pulse laser beam L is hardly transmitted through the workpiece 81. As a result, necessary beam intensity for forming the laser filaments F inside the edge portion 84 cannot be obtained.

FIG. 3A shows the optical axis of the ultrashort pulse laser beam L by one-dot chain line. As shown in FIG. 3A, in the present embodiment, the ultrashort pulse laser beam L emitted from the laser machining head 4 propagates through air, and is incident on the inclined surface 13 of the laser beam transmissive member 3 to be transmitted through the laser beam transmissive member 3. The ultrashort pulse laser beam L is transmitted through the inside of the laser beam transmissive member 3 from the inclined surface 13 and reaches the contacted surface 11 without exiting from the laser beam transmissive member 3 to the air. The ultrashort pulse laser beam L is then incident on the surface of the workpiece 81 (the side surface 83) from the contacted surface 11, and transmitted through the first edge portion 85 from the side surface 83. The ultrashort pulse laser beam L is transmitted through the inside of the first edge portion 85 in a chamfering direction. The "chamfering direction" is a direction in which the tapered surface 94 (the first tapered surface 95) to be formed as a result of irradiation with the ultrashort pulse laser beam L is inclined relative to one of the two surfaces forming the edge portion 84 (the first edge portion 85), which is irradiated with the ultrashort pulse laser beam L, the one surface being in contact with the laser beam transmissive member 3 (i.e., the side surface 83).

The inclined surface 13 is inclined in the opposite direction to the chamfering direction by an inclination angle φ relative to the contacted surface 11 and the surface of the workpiece 81 (the side surface 83), which is in contact with the contacted surface 11. The wording "inclined in the opposite direction" herein means being inclined with respect to an axis that extends in the same direction as the extending direction of an axis with respect to which the chamfering direction is inclined, but being inclined in the opposite direction to the chamfering direction. The chamfering direction is inclined (clockwise in FIG. 3A) in one direction with respect to an axis that extends in the extending direction of the first edge portion 85 (i.e., the direction perpendicular to the plane of FIG. 3) relative to the surface of the workpiece 81 (the side surface 83), which is in contact with the laser beam transmissive member 3, by the chamfering angle $\theta_C$. On the other hand, the inclined surface 13 is inclined (counterclockwise in FIG. 3A) in the opposite direction to the chamfering direction with respect to another axis that also extends in the extending direction of the first edge portion 85 relative to the surface (the side surface 83) by the inclination angle φ. The chamfering angle $\theta_C$ and the inclination angle φ herein are both acute angles.

The inclined surface 13 forms an interface between the laser beam transmissive member 3 and a medium (the air) through which the ultrashort pulse laser beam L emitted from the laser machining head 4 propagates. The contacted surface 11 and the surface (the side surface 83) being in contact therewith form an interface between the laser beam transmissive member 3 and the workpiece 81. Hereinafter, it is assumed that the incidence angle of the ultrashort pulse laser beam L at the inclined surface 13 of the laser beam transmissive member 3 is $i_1$; the refraction angle thereof is $r_1$; the incidence angle of the ultrashort pulse laser beam L at the surface (the side surface 83) of the workpiece 81 is $i_2$; and the refraction angle thereof is $r_2$. It is also assumed that the absolute refractive index of the air for the ultrashort pulse laser beam L is $n_A$; the absolute refractive index of the laser beam transmissive member 3 for the ultrashort pulse laser beam L is $n_B$; and the absolute refractive index of the workpiece 81 for the ultrashort pulse laser beam L is $n_C$. It is further assumed that the incidence position of the ultrashort pulse laser beam L on the inclined surface 13 is $P_1$; the incidence position of the ultrashort pulse laser beam L on the surface (the side surface 83) is $P_2$; and the intersection point of the inclined surface 13 and the contacted surface 11 is V.

Based on the Snell's law, the incidence angle $i_1$ and the refraction angle $r_1$ satisfy the following equation: $sini_1/sinr_1=n_B/n_A$. Also, the incidence angle $i_2$ and the refraction angle $r_2$ satisfy the following equation: $sini_2/sinr_2=n_C/n_B$. The refraction angle $r_2$ is the complementary angle of the chamfering angle $\theta_C$, and satisfies the following equation: $r_2=90-\theta_C$. The sum of the inner angles of $\triangle VP_1P_2$ is 180°; $\angle VP_1P_3=90+r_1$; and $\angle VP_2P_1=90-i_2$. Accordingly, the inclination angle φ($\angle P_1VP_2$) satisfies the following equation: φ=$i_2-r_1$.

In order to set the chamfering angle $\theta_C$ to 45°, which is one example of a desirable value, it is necessary to increase the refraction angle $r_2$ to 45°, and it is also necessary to increase the incidence angle $i_2$ in accordance therewith. In the present embodiment, by bringing the inclination angle φ close to the incidence angle $i_2$, the refraction angle $r_1$ and consequently the incidence angle $i_1$ are allowed to be small ($r_1=i_2-φ$). This makes it possible to suppress the reflection loss at the inclined surface 13 and allow the ultrashort pulse laser beam L to be transmitted through the laser beam transmissive member 3. In particular, if the inclination angle φ is equal to the incidence angle $i_2$, the ultrashort pulse laser beam L can be made incident on the inclined surface 13 perpendicularly. In this case, there is substantially no reflection. It should be noted that if the inclination angle φ is greater than the incidence angle $i_2$ (i.e., if the refraction angle $r_1$ is a negative value), then the ultrashort pulse laser beam L is incident on the inclined surface 13 from the opposite side to the incidence direction shown in FIG. 3A with respect to the normal line to the inclined surface 13.

As one non-limiting example, assume that the incidence angle $i_1$ is 17.5°; the relative refractive index $n_B/n_A$ of the laser beam transmissive member 3 to the air is 1.45; and the relative refractive index $n_C/n_B$ of the workpiece 81 to the laser beam transmissive member 3 is 1.00. In this case, in order to obtain the chamfering angle $\theta_C$ of 45°, the refraction angle $r_1$ needs to be 12.0° ($r_1$=arcsin (sin17.5°/1.45)), which is the same as the refraction angle r in the comparative example, while the refraction angle $r_2$ needs to be 45°. At the time, the chamfering angle $\theta_C$ of 45° can be realized if the inclination angle φ is 33°, because in this case the incidence angle $i_2$ is 45°, and the incidence angle $i_2$ and the refraction angle $r_2$ follow the Snell's law ($\sin i_2/\sin r_2 = 1.00$).

As previously described, various materials are applicable as the material of the workpiece 81. The workpiece 81 is a brittle material that allows the ultrashort pulse laser beam L to be transmitted therethrough (e.g., transparent ceramic, polymer, transparent conductor, various glass, rock crystal, quartz, diamond, sapphire, etc.) The laser beam transmissive member 3 is a prism, and a laser beam transmissive material such as optical glass is selected as the material of the laser beam transmissive member 3. When the material of the workpiece 81 and the required chamfering angle $\theta_C$ are determined, the inclination angle $\varphi$ of the laser beam transmissive member 3 can be determined, accordingly.

The ultrashort pulse laser beam L propagates in the chamfering direction inside the first edge portion 85. As described above, the ultrashort pulse laser beam L reaches the inside of the first edge portion 85 with suppressed reflection loss. This makes it possible to keep the beam intensity high inside the first edge portion 85. Consequently, a laser filament F is formed extending in the chamfering direction. The laser filament F is formed inside the first edge portion 85, that is, formed between the two surfaces forming the first edge portion 85 (i.e., the side surface 83 and the first flat surface 82a). It should be noted that since the focal length of the ultrashort pulse laser beam L is adjusted as previously described, the laser filament F is not formed inside the laser beam transmissive member 3. The ultrashort pulse laser beam L transmitted through the inside of the first edge portion 85 exits the workpiece 81 from the other one of the two surfaces forming the first edge portion 85 (i.e., exits from the first flat surface 82a).

Returning to FIG. 2A, as a result of irradiating the inclined surface 13 with the ultrashort pulse laser beam L while moving the laser machining head 4, a large number of laser filaments F are arranged in the extending direction of the first edge portion 85 at minute intervals. After the laser filaments F are formed over the entire first edge portion 85 in the extending direction, by lightly hitting the corner of the first edge portion 85, the tip side of the first edge portion 85 can be separated from the workpiece 81, such that the separation is made at the positions where the laser filaments F are formed. It should be noted that in a case where the workpiece 81 is made of non-tempered glass, it is possible that the corner portion cannot be separated by merely forming the laser filaments F. In this case, the corner portion can be separated by additionally applying heat to the cut positions with a heat source, such as a laser. As a result, the first chamfered portion 92 is formed, which includes the first tapered surface 95, which is inclined by the chamfering angle $\theta_C$ relative to the surface (the side surface 83).

As described above, by irradiating the workpiece 81 with the ultrashort pulse laser beam L through the laser beam transmissive member 3 including the inclined surface 13, which is inclined in the opposite direction to the chamfering direction of the chamfered portion to be formed (i.e., the first chamfered portion 92), a desirable chamfering angle $\theta_C$ can be obtained even when the incidence angle $i_1$ at the inclined surface 13 is made sufficiently small. Moreover, during the formation of the chamfered portion (the first chamfered portion 92), cullet is not generated from the workpiece 81. Therefore, a large cleaning device for cleaning the workpiece 81 after the chamfering is not required. Since the concern about the adhesion of cullet to the workpiece 81 is reduced, quality inspection at the end of the process can be simplified.

In the present embodiment, in a state where the laser beam transmissive member 3 extends in the extending direction of the edge portion 84 and is in contact with the surface of the workpiece 81 (the side surface 83), the laser machining head 4 emits the ultrashort pulse laser beam L to the inclined surface 13 of the laser beam transmissive member 3 while being moved by the machining head scanning device 6 in the extending direction of the edge portion 84 relative to the laser beam transmissive member 3 and the workpiece 81. This makes it possible to readily keep the laser beam transmissive member 3 in surface contact with the workpiece 81, and readily prevent the reflection of the ultrashort pulse laser beam L on the surface of the workpiece 81.

Figure 4A:
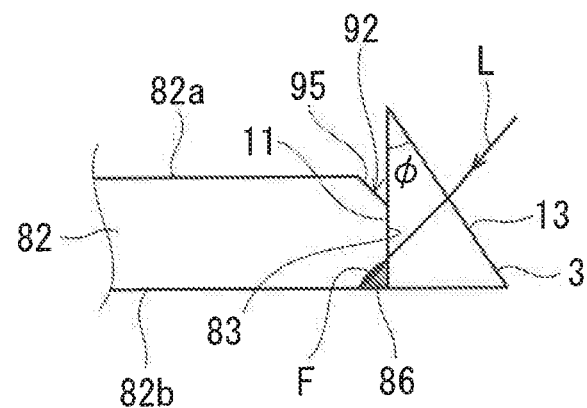
FIGS. 4A to 4C show one example of the chamfering method.
Figure 4B:
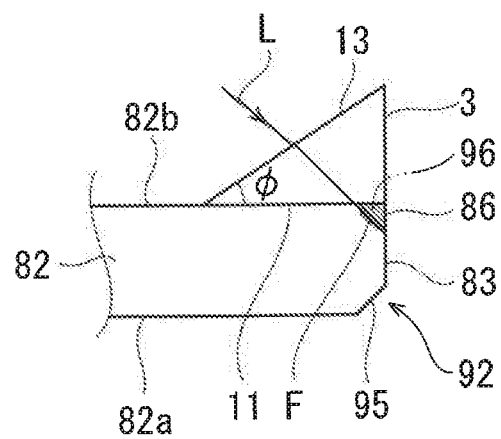
Figure 4C:
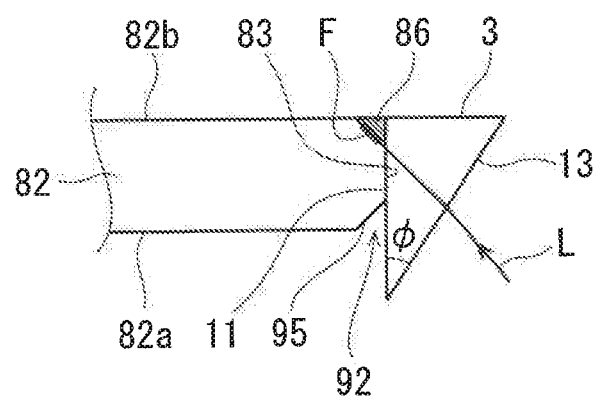

FIGS. 4A to 4C show one example of a method of performing chamfering on one of the second edge portions 86. As shown in FIG. 4A, after the chamfering of the first edge portion 85 is ended, the workpiece 81 may be turned over and supported on the top surface 2a of the holding stand 2. Then, chamfering may be performed on the second edge portion 86 in the same manner as the chamfering of the first edge portion 85. As shown in FIG. 4B, the laser beam transmissive member 3 may contact the second flat surface 82b, which is one of the two surfaces forming the second edge portion 86. In this case, the chamfering direction is the direction in which the second tapered surface 96 to be formed is inclined relative to the second flat surface 82b, and the inclined surface 13 is inclined relative to the second flat surface 82b in the opposite direction to the chamfering direction. It should be noted that the chamfering of the first edge portion 85 may also be performed such that the laser beam transmissive member 3 is brought into contact with the first flat surface 82a in such a manner as shown FIG. 4B. However, it is highly likely that the first flat surface 82a and the second flat surface 82b serve as design surfaces of the product 90, which are visible while the product 90 is in use. By bringing the contacted surface 11 into contact with the side surface 83, which is the less visible one of the two surfaces during the use of the product 90, as shown in FIGS. 3B and 4A, laser filaments F can be formed by using the laser beam transmissive member 3 without having a concern about possible damage to the design surfaces. Further alternatively, as shown in FIG. 4C, the contacted surface 11 of the laser beam transmissive member 3 may be brought into contact with the side surface 83, and then the inclined surface 13 may be irradiated with the ultrashort pulse laser beam L from below. It should be noted that the chamfering of the first edge portion 85 may also be performed in such a manner as shown in FIG. 4C.

(Embodiment 2)

Figure 5A:
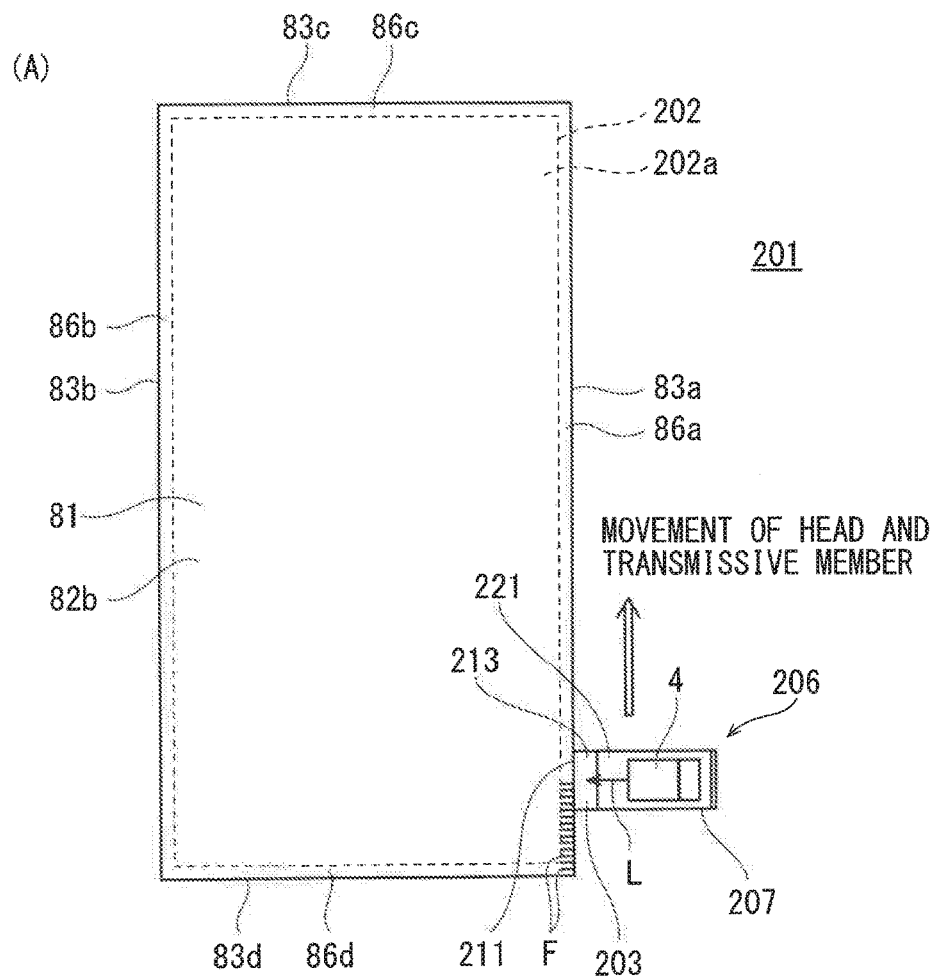
FIG. 5A is a plan view of a chamfering apparatus according to Embodiment 2.
Figure 5B:
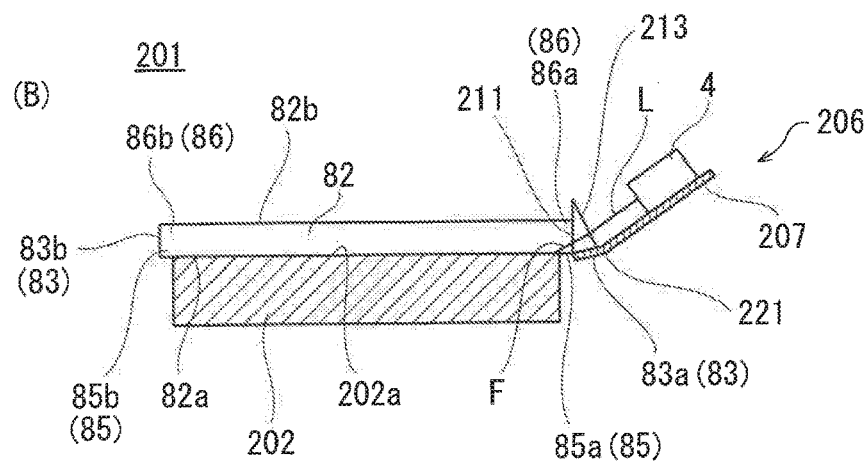
FIG. 5B is a sectional view of the chamfering apparatus of FIG. 5A.

As shown in FIGS. 5A and 5B, in a chamfering apparatus 201 of Embodiment 2, a machining head scanning device 206 includes: a machining head holder 207 configured to hold the laser machining head 4; and a transmissive member holder 221 configured to hold a laser beam transmissive member 203. Similar to Embodiment 1, the laser beam transmissive member 203 is also made of an optical glass prism, and includes: a contacted surface 211, which contacts one of the two surfaces forming the edge portion 84 of the workpiece 81 (in the illustrated example, the side surface 83 forming part of the first edge portion 85); and an inclined surface 213, which is, when the contacted surface 211 is in contact with the one surface, inclined relative to the contacted surface 211 and the one of the surfaces of the workpiece 81, the one surface being in contact with the contacted surface 211. The inclined surface 213 is inclined relative to the one surface in the opposite direction to the chamfering direction of the chamfered portion 91 to be formed.

The machining head scanning device 206 moves the laser machining head 4 and the laser beam transmissive member 203 in the extending direction of the edge portion 84 relative to the workpiece 81 in a state where the laser beam transmissive member 203 held by the transmissive member holder 221 is in contact with one of the two surfaces forming the edge portion 84 of the workpiece 81. The laser machining head 4 emits the ultrashort pulse laser beam L to the inclined surface 213 of the laser beam transmissive member 203 while being moved together with the laser beam transmissive member 203 by the machining head scanning device 206 in the extending direction of the edge portion 84 relative to the workpiece 81.

In the present embodiment, the laser beam transmissive member 203 moves together with the laser machining head 4. For this reason, it is not necessary for the laser beam transmissive member 3 to be long in the extending direction of the edge portion 84. This makes it possible to make the laser beam transmissive member 3 compact. The machining head holder 207 is fixed to the transmissive member holder 221 or integrally formed on the transmissive member holder 221. As a result, the laser machining head 4 is held by the machining head holder 207 in such a manner that the position of the laser machining head 4 relative to the laser beam transmissive member 203 held by the transmissive member holder 221 does not change. This makes it possible to keep constant the incidence angle $i_1$ of the ultrashort pulse laser beam L at the inclined surface 213 and the focal position of the ultrashort pulse laser beam L.

As shown in FIGS. 5A and 5B, the edge lines of a top surface 202a of a holding stand 202 are positioned inward of the edge lines of the workpiece 81. Since the holding stand 202 is thus positioned inward, even when the transmissive member holder 221 is moved close to the holding stand 202 to bring the laser beam transmissive member 203 into contact with the workpiece 81, interference of the transmissive member holder 221 with the holding stand 202 can be avoided.

(Embodiment 3)

Figure 6:
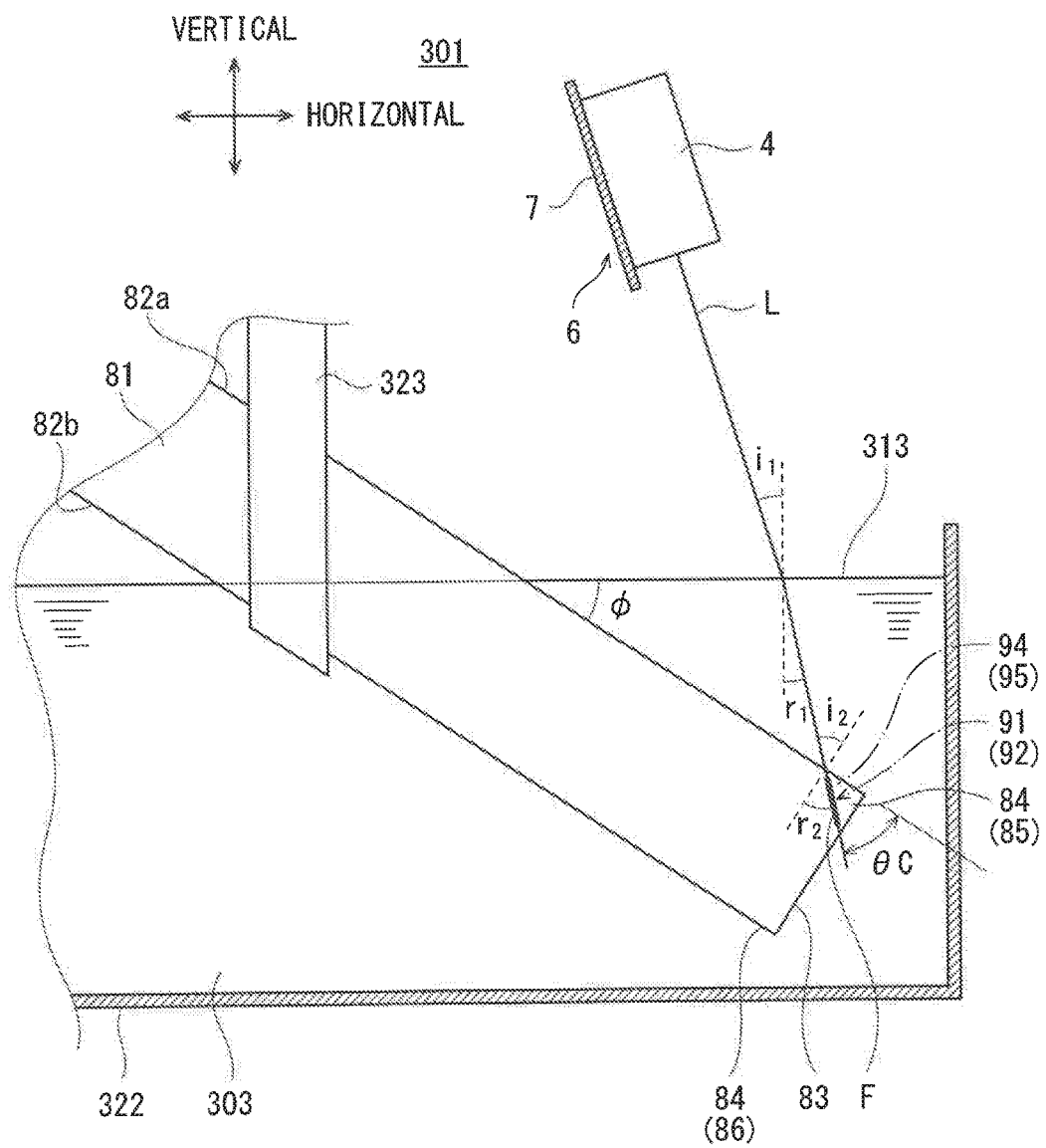
FIG. 6 is a side view of a chamfering apparatus according to Embodiment 3.

As shown in FIG. 6, in a chamfering apparatus 301 of Embodiment 3, a laser beam transmissive member 303 is a liquid member, and the chamfering apparatus 301 includes a transmissive member reservoir 322 configured to store the laser beam transmissive member 303. The workpiece 81 is held by a workpiece holder 323 in a state where the edge portions 84 are immersed in the laser beam transmissive member 303 stored in the transmissive member reservoir 322.

In this case, the liquid surface 313 of the laser beam transmissive member 303 in the transmissive member reservoir 322 is horizontal. The liquid surface 313 forms the inclined surface of the laser beam transmissive member 303. The workpiece holder 323 holds the workpiece 81 in a state where one of the two surfaces forming the edge portion 84 of the workpiece 81 (in the illustrated example, the first flat surface 82a) is inclined relative to the liquid surface 313. Since the edge portion 84 is immersed in the laser beam transmissive member 303, the laser beam transmissive member 303 is in contact with the first flat surface 82a, and the first flat surface 82a forms an interface between the laser beam transmissive member 303 and the workpiece 81. The liquid surface 313 of the laser beam transmissive member 303 is inclined relative to the first flat surface 82a by the inclination angle φ. The chamfering direction of the chamfered portion 91 to be formed (i.e., the direction in which the tapered surface 94 is inclined relative to the first flat surface 82a) is inclined in the opposite direction to the liquid surface 313 with respect to the first flat surface 82a.

The ultrashort pulse laser beam L emitted from the laser machining head 4 propagates through air, and is then incident on the liquid surface 313 of the laser beam transmissive member 303. The ultrashort pulse laser beam L is refracted at the liquid surface 313, transmitted through the laser beam transmissive member 303, and incident on the first flat surface 82a. The ultrashort pulse laser beam L is refracted at the first flat surface 82a, and transmitted through the inside of the edge portion 84 in the chamfering direction.

The laser beam transmissive member 303 is water, for example. A laser beam whose attenuation coefficient in water is small is used as the ultrashort pulse laser beam L. As one example, the attenuation coefficient of the ultrashort pulse laser beam L in water may be set to 10% or less. The attenuation coefficient is correlated with the wavelength of the ultrashort pulse laser beam L, and becomes a minimum value at a particular wavelength. Therefore, the wavelength may be set within a range that contains a wavelength value at which the attenuation coefficient becomes the minimum value. By setting the wavelength of the ultrashort pulse laser beam L in accordance with the laser beam transmissive member 303 in this manner, necessary beam intensity for forming laser filaments F inside the edge portion 84 of the workpiece 81 can be kept, and thereby the laser filaments F can be formed inside the edge portion 84.

As one non-limiting example, assume that the relative refractive index of the laser beam transmissive member 303 (which is water) relative to the air is 1.33, and the relative refractive index of the workpiece 81 relative to the laser beam transmissive member 3 is 1.09. In this case, in order to obtain the chamfering angle $\theta_C$ of 45°, the refraction angle $r_2$ needs to be 45°, and the incidence angle $i_2$ needs to be 50.4° ($i_2$=arcsin (1.09sin45°)). If the workpiece 81 is held such that the inclination angle φ is equal to the incidence angle $i_2$, the chamfering angle $\theta_C$ of 45° can be obtained by causing the ultrashort pulse laser beam L to be perpendicularly incident on the liquid surface 313. If the incidence angle $i_1$ is 17.5°, the refraction angle $r_1$ is 13.1° ($r_1$=arcsin (sin17.5°/1.33)). Therefore, if the workpiece 81 is held such that the inclination angle φ is 37.3° (φ=50.4−13.1), the chamfering angle $\theta_C$ of 45° is obtained.

Figure 7:
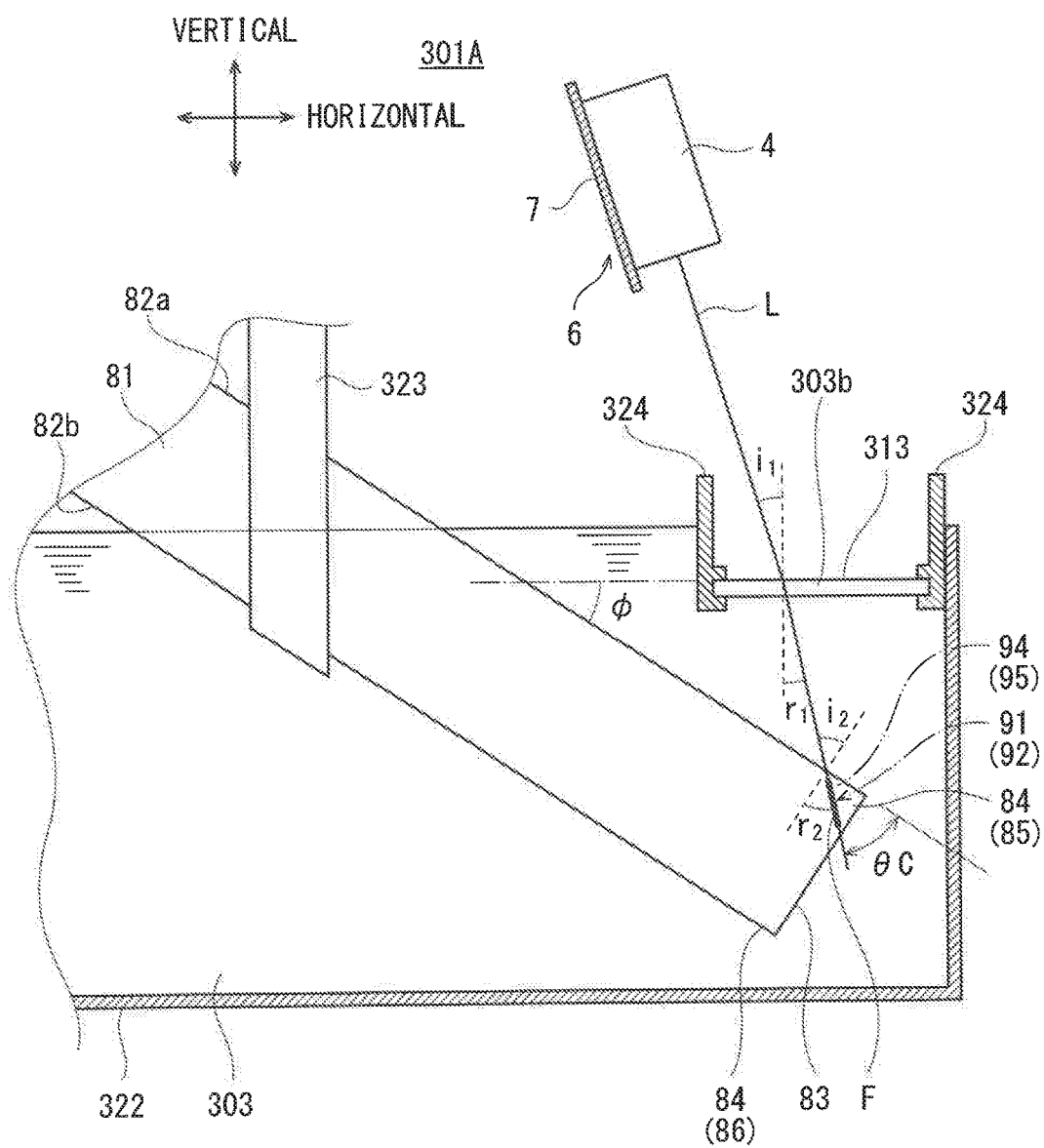
FIG. 7 shows one variation of Embodiment 3.

FIG. 7 shows one variation of Embodiment 3. As shown in FIG. 7, a transmissive plate 303b, which allows a laser beam to be transmitted therethrough, may be held by a transmissive plate holder 324, and part of the transmissive plate holder 324 may be submerged under the liquid surface of a liquid laser beam transmissive member 303a. As one example, the transmissive plate holder 324 is cylindrical. The transmissive plate 303b is held at one end of the transmissive plate holder 324; the lower surface of the transmissive plate 303b is in contact with the laser beam transmissive member 303a; and the upper surface of the transmissive plate 303b is in contact with the inner space of the transmissive plate holder 324, i.e., in contact with air. The upper surface of the transmissive plate 303b and the surface of the workpiece (the first flat surface 82a) form the inclination angle φ. The ultrashort pulse laser beam L propagates through the air. Then, the ultrashort pulse laser beam L is incident on the upper surface of the transmissive plate 303b, transmitted through the transmissive plate 303b, and exits from the lower surface of the transmissive plate 303b to be incident on the liquid laser beam transmissive member 303a. Thereafter, the ultrashort pulse laser beam L is transmitted through the laser beam transmissive member 303a, incident on the surface of the workpiece 81 (the first flat surface 82a), and transmitted through the inside of the edge portion of the workpiece 81. Also in this variation, similar to Embodiment 3, laser filaments F can be formed inside the edge portion 85 (the first edge portion 85). In particular, compared to a case where the laser beam is directly incident on the liquid surface, a concern about reflection of the laser beam due to bubbling at the liquid surface is eliminated. This makes it possible to keep necessary beam intensity for forming the laser filaments F inside the workpiece 81.

(Embodiment 4)

Figure 8A:
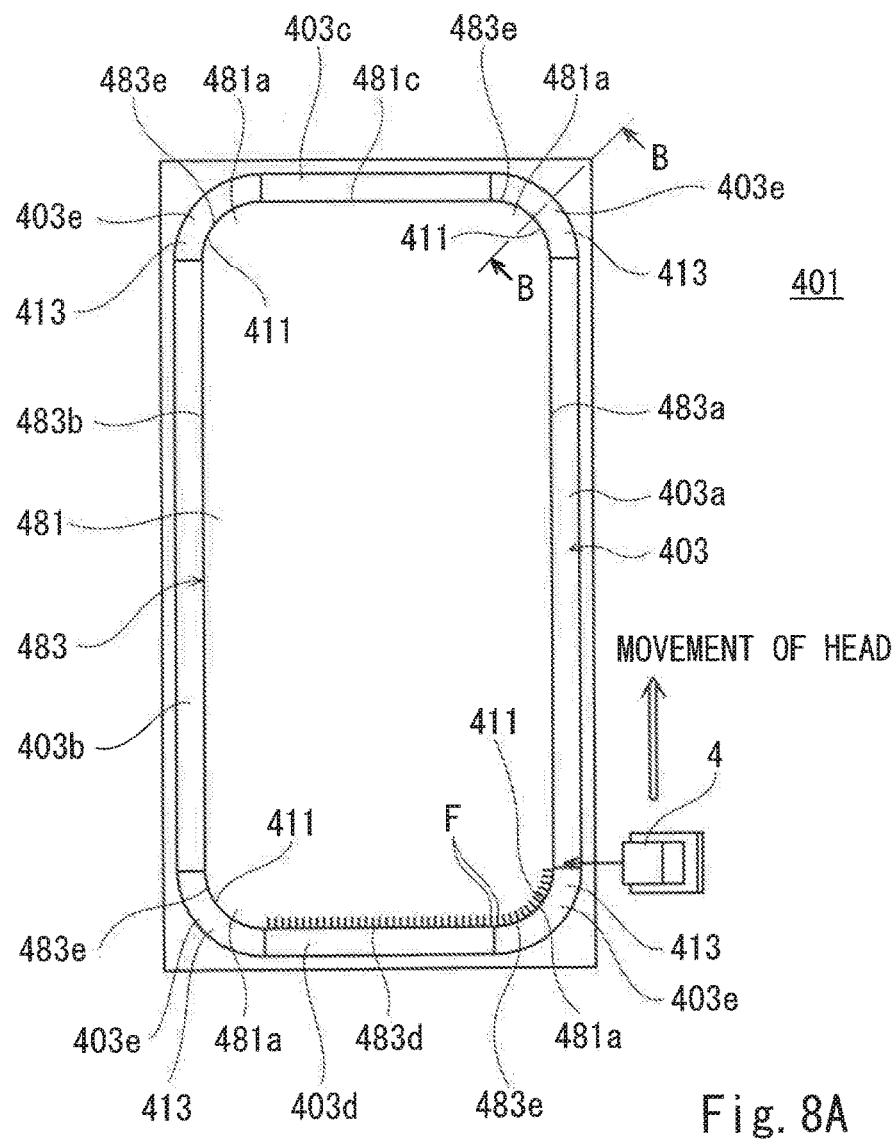
FIG. 8A is a plan view of a chamfering apparatus according to Embodiment 4.
Figure 8B:
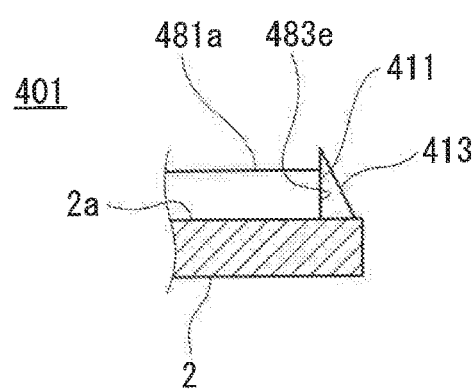
FIG. 8B is a view seen in the direction of arrows B-B of FIG. 8A.

As shown in FIGS. 8A and 8B, in Embodiment 4, the shape of a workpiece 481 when seen in a plan view is different from the shape of the workpiece in the foregoing embodiments. The workpiece 481 is rounded rectangular when seen in a plan view. At each of the four corners of the workpiece 481, when seen in a plan view, a quarter arc-shaped rounded corner portion 481a is formed. In this case, side surfaces 483 of the workpiece 481 include curved side surfaces 483e, each of which connects between one of two long side surfaces 483a and 483b and one of two short side surfaces 483c and 483d. Similar to Embodiment 1, a laser beam transmissive member 403 of a chamfering apparatus 401 is supported by the top surface 2a of the holding stand 2 together with the workpiece 481. The laser beam transmissive member 403 includes: transmissive members 403a to 403d similar to the four transmissive members 3a to 3d of Embodiment 1 (see FIG. 2A); and curved transmissive members 403e, which are in contact with the respective curved side surfaces 483e. Each curved transmissive member 403e includes: a contacted surface 411, which is curved so as to make surface contact with the corresponding curved side surface 483e; and an inclined surface 413, which is inclined relative to the contacted surface 411. The laser machining head 4 emits the ultrashort pulse laser beam L to the inclined surface 413 of each curved transmissive member 403e while moving along the arc of the corresponding rounded corner portion 481a, and thereby laser filaments F can be formed inside the rounded corner portion 481a similar to the foregoing embodiments.

(Embodiment 5)

Figure 9A:
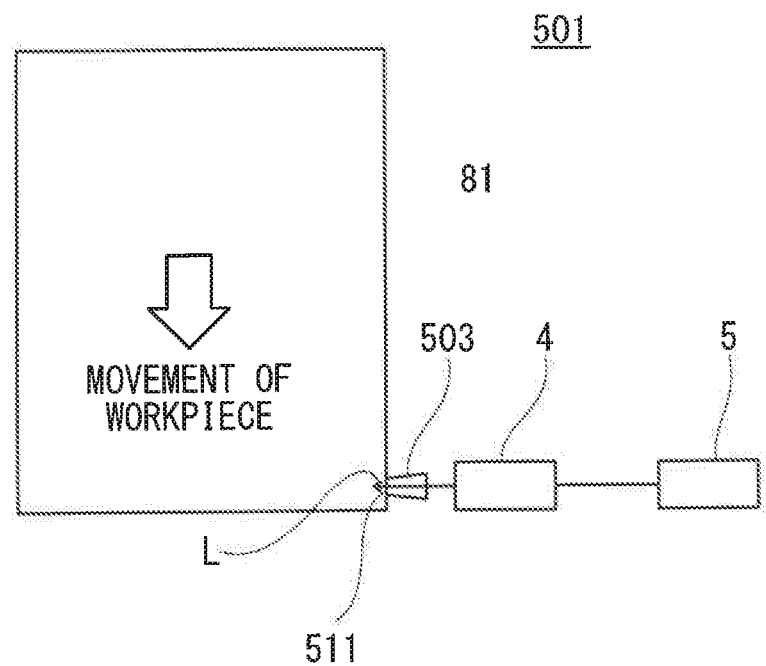
FIG. 9A is a plan view of a chamfering apparatus according to Embodiment 5.
Figure 9B:
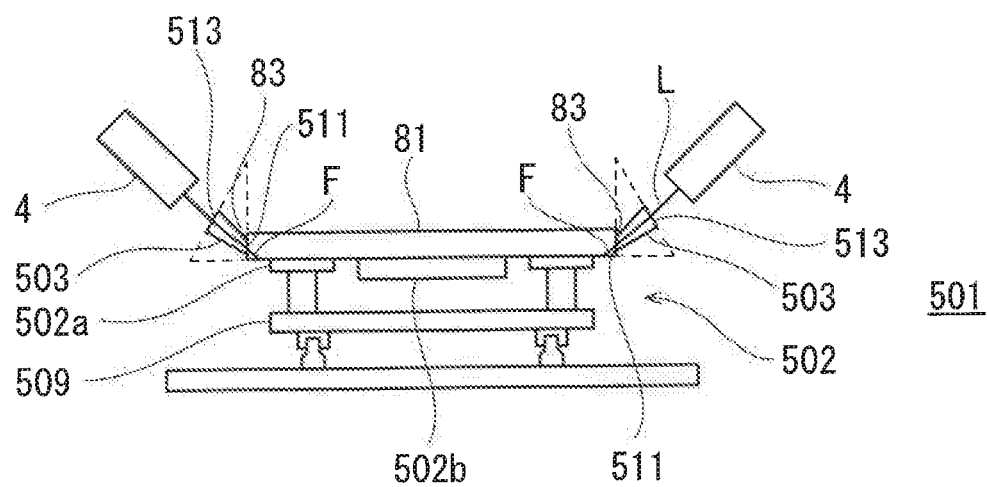
FIG. 9B is a sectional view of the chamfering apparatus of FIG. 9A.

As shown in FIGS. 9A and 9B, in Embodiment 5, a chamfering apparatus 501 includes, instead of the head scanning device, a workpiece conveying device configured to move the workpiece 81 in the extending direction of the edge portion. In the present embodiment, the laser machining head 4 and a laser beam transmissive member 503 do not move. The chamfering apparatus 501 includes a running truck 509 configured to run on a floor surface. A holder 502 is provided on the running truck 509. The holder 502 includes: clamp portions 502a provided at both ends of the running truck 509 and configured to support the workpiece 81 from below; and a support portion 502b configured to support the workpiece 81 from below between the clamp portions 502a. The running truck 509 moves parallel to the extending direction of the edge portion 85, thereby conveying the workpiece 81 in the extending direction of the edge portion 85. At the time, the workpiece 81 moves relative to the laser machining head 4 and the laser beam transmissive member 3 while keeping one of the two surfaces forming the edge portion 85 (the side surface 83) in surface contact with a contacted surface 511 of the laser beam transmissive member 503. Also in the present embodiment, similar to the foregoing embodiments, laser filaments F can be formed inside the edge portion 85 of the workpiece 81, and thereby chamfering can be performed on the edge portion 85.

As shown in FIGS. 10A and 10B, the contacted surface 511 and an inclined surface 513 of the laser beam transmissive member 503 do not intersect. The laser beam transmissive member 503 has such a roughly conical shape that it is tapered from the inclined surface 513 toward the contacted surface 511. Such a shape allows the laser beam transmissive member 503 to be compact. Owing to such a shape, the area of contact between the workpiece 81 and the laser beam transmissive member 503 is small, which makes it possible to reduce damage to the surface of the workpiece 81 and/or the contacted surface 511 of the laser beam transmissive member 503 even when the workpiece 81 and the laser beam transmissive member 503 are slid against each other.

(Embodiment 6)

As shown in FIG. 11, a laser beam transmissive member 603 of Embodiment 6 has a roughly right-triangle shape similar to Embodiment 1. However, a contacted surface 611 of the laser beam transmissive member 603 is short in the thickness direction, and is in contact with only a part of the side surface 83. The contacted surface 611 is continuous with a recessed surface 614 via a step. In a state where the contacted surface 611 is in contact with the surface of the workpiece 81 (the side surface 83), the recessed surface 614 is away from the surface of the workpiece 81. A spacer 625 is provided between the surface of the workpiece 81 and the recessed surface 614. In this case, even when the workpiece 81 and the laser beam transmissive member 603 are slid against each other, since the contacted surface 611 is small, damage to the surface of the workpiece 81 and/or the contacted surface 611 of the laser beam transmissive member 603 can be reduced. While the contacted surface 611 is made small, the recessed surface is supported by the surface of the workpiece 81 via the spacer 625. This makes it possible to stabilize the orientation of the laser beam transmissive member 603 relative to the workpiece 81. For example, the spacer 625 is made of a material that is more brittle than the material of the workpiece 81, such as synthetic resin. Therefore, even when the workpiece 81 slides against the spacer, the workpiece 81 will not be damaged. This makes it possible to improve the quality.

(Variations)

Although the embodiments of the present invention have been described above, modifications, additions, and deletions can be suitably made to the above-described configurations without departing from the scope of the present invention.

Although the details are not shown, in a state where the laser beam transmissive member is in contact with one of the surfaces of the workpiece, the laser beam transmissive member may be moved by the workpiece conveying device together with the workpiece in the extending direction of the edge portion. Also in this case, the head scanning device can be eliminated, and the laser machining head need not be conveyed by the workpiece conveying device. The laser machining head is only required to emit the ultrashort pulse laser beam to the inclined surface of the laser beam transmissive member while the laser beam transmissive member is being moved by the workpiece conveying device. As a result, a plurality of laser filaments arranged in the extending direction of the edge portion can be formed in the edge portion of the workpiece. This variation is also applicable to chamfering of an edge portion formed by two surfaces that intersect and form a non-right angle, and also applicable to a case where it is desired to obtain a chamfering angle of not 45°. The plan-view shape of the plate-shaped workpiece is not particularly limited. Although the embodiments have been described by taking the chamfering of a plate-shaped workpiece in the manufacturing process of a plate-shaped product as one example, the present invention is also applicable to the manufacturing of a product having a different shape and to the chamfering of a workpiece having a different shape. For example, chamfering may be performed on the edges of the raw material 80.

REFERENCE SIGNS LIST

1, 201, 301, 401 chamfering apparatus
3, 203, 303, 403 laser beam transmissive member
4 laser machining head
6 machining head scanning device
7, 207 machining head holder
11, 211, 411 contacted surface
13, 213, 413 inclined surface
81, 481 workpiece
82a first flat surface
82b second flat surface
83, 483 side surface
84 edge portion
94 tapered surface
221 transmissive member holder
313 liquid surface
322 transmissive member reservoir
323 workpiece holder
L ultrashort pulse laser beam
F laser filament
$i_1$ incidence angle at the inclined surface of the laser beam transmissive member
$r_1$ refraction angle at the inclined surface of the laser beam transmissive member
$i_2$ incidence angle at the surface of the workpiece
$r_2$ refraction angle at the surface of the workpiece

The invention claimed is:

1. A chamfering apparatus for forming a tapered surface on an edge portion formed by two surfaces of a workpiece, the workpiece allowing a laser beam to be transmitted therethrough, the tapered surface extending in a chamfering direction that is inclined relative to one of the two surfaces, the chamfering apparatus comprising:
   a laser beam transmissive member that allows a laser beam to be transmitted therethrough and that contacts the one surface of the workpiece, the laser beam transmissive member including an inclined surface that is inclined in an opposite direction to the chamfering direction relative to the one surface in a state where the laser beam transmissive member is in contact with the one surface; and
   a laser machining head configured to emit an ultrashort pulse laser beam for forming a laser filament inside the edge portion to the inclined surface of the laser beam transmissive member, such that the ultrashort pulse laser beam is transmitted through the laser beam transmissive member, incident on the one surface of the workpiece from the laser beam transmissive member, transmitted through the edge portion in the chamfering direction, and forms the laser filament inside the edge portion, the laser filament extending in the chamfering direction.

2. The chamfering apparatus according to claim 1, comprising a machining head scanning device configured to move the laser machining head in an extending direction of the edge portion, wherein
   the laser beam transmissive member extends in the extending direction in a state where the laser beam transmissive member is in contact with the one surface, and
   the laser machining head emits the ultrashort pulse laser beam to the inclined surface of the laser beam transmissive member while being moved by the machining head scanning device in the extending direction relative to the laser beam transmissive member and the workpiece.

3. The chamfering apparatus according to claim 1, comprising a machining head scanning device including: a machining head holder configured to hold the laser machining head; and a transmissive member holder configured to hold the laser beam transmissive member, the machining head scanning device moving the laser machining head and the laser beam transmissive member in an extending direction of the edge portion relative to the workpiece in a state where the laser beam transmissive member held by the transmissive member holder is in contact with the one surface, wherein
   the laser machining head emits the ultrashort pulse laser beam to the inclined surface of the laser beam transmissive member while being moved by the machining head scanning device together with the laser beam transmissive member in the extending direction relative to the workpiece.

4. The chamfering apparatus according to claim 1, comprising a workpiece conveying device configured to move the workpiece parallel to an extending direction of the edge portion, wherein
   the laser machining head and the laser beam transmissive member are not conveyed by the workpiece conveying device,
   the laser beam transmissive member contacts the one surface of the workpiece while the workpiece is being moved by the workpiece conveying device in the extending direction, and
   the laser machining head emits the ultrashort pulse laser beam to the inclined surface of the laser beam transmissive member.

5. The chamfering apparatus according to claim 1, comprising a workpiece conveying device configured to move the workpiece parallel to an extending direction of the edge portion, wherein
   the laser machining head is not conveyed by the workpiece conveying device,
   the laser beam transmissive member is moved by the workpiece conveying device together with the workpiece in a state where the laser beam transmissive member is in contact with the one surface, and
   the laser machining head emits the ultrashort pulse laser beam to the inclined surface of the laser beam transmissive member while the laser beam transmissive member is being moved by the workpiece conveying device.

6. The chamfering apparatus according to claim 1, wherein
   the laser beam transmissive member includes:
      a contacted surface that makes surface contact with the one surface; and
      a prism including the inclined surface.

7. The chamfering apparatus according to claim 1, wherein
   the laser beam transmissive member is a liquid member, the chamfering apparatus comprises:

a transmissive member reservoir configured to store the laser beam transmissive member; and a workpiece holder configured to hold the workpiece in a state where the edge portion is immersed in the laser beam transmissive member stored in the transmissive member reservoir, a liquid surface of the laser beam transmissive member in the transmissive member reservoir forms the inclined surface, and the workpiece holder holds the workpiece in a state where the one surface of the workpiece is inclined relative to the liquid surface.

8. A chamfering method of forming a tapered surface on an edge portion formed by two surfaces of a workpiece, the workpiece allowing a laser beam to be transmitted therethrough, the tapered surface extending in a chamfering direction that is inclined relative to one of the two surfaces, the method comprising:

bringing a laser beam transmissive member that allows a laser beam to be transmitted therethrough into contact with the one surface, such that an inclined surface of the laser beam transmissive member is inclined in an opposite direction to the chamfering direction relative to the one surface;

emitting an ultrashort pulse laser beam for forming a laser filament inside the edge portion to the inclined surface of the laser beam transmissive member, such that the ultrashort pulse laser beam is transmitted through the laser beam transmissive member, incident on the one surface of the workpiece from the laser beam transmissive member, and transmitted through the edge portion in the chamfering direction; and forming a laser filament inside the edge portion by the ultrashort pulse laser beam, the laser filament extending in the chamfering direction.

9. The chamfering apparatus according to claim 2, wherein
the laser beam transmissive member includes:
a contacted surface that makes surface contact with the one surface; and
a prism including the inclined surface.

10. The chamfering apparatus according to claim 3, wherein
the laser beam transmissive member includes:
a contacted surface that makes surface contact with the one surface; and
a prism including the inclined surface.

11. The chamfering apparatus according to claim 4, wherein
the laser beam transmissive member includes:
a contacted surface that makes surface contact with the one surface; and
a prism including the inclined surface.

12. The chamfering apparatus according to claim 5, wherein
the laser beam transmissive member includes:
a contacted surface that makes surface contact with the one surface; and
a prism including the inclined surface.

13. The chamfering apparatus according to claim 2, wherein
the laser beam transmissive member is a liquid member, the chamfering apparatus comprises:
a transmissive member reservoir configured to store the laser beam transmissive member; and
a workpiece holder configured to hold the workpiece in a state where the edge portion is immersed in the laser beam transmissive member stored in the transmissive member reservoir,
a liquid surface of the laser beam transmissive member in the transmissive member reservoir forms the inclined surface, and
the workpiece holder holds the workpiece in a state where the one surface of the workpiece is inclined relative to the liquid surface.

\* \* \* \* \*